3,160,582
COMBINED STRIPPING AND FLASHING OPERATION

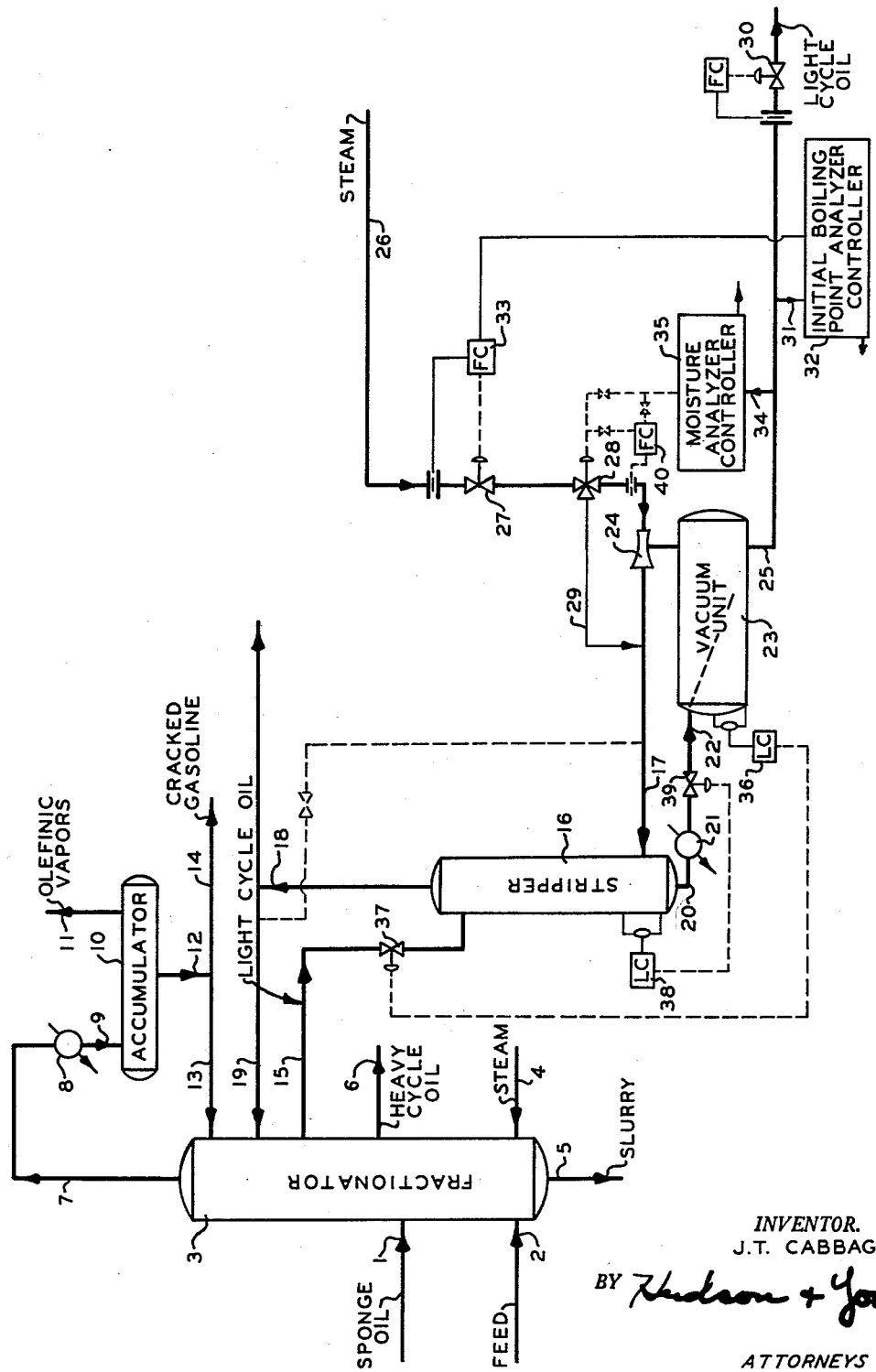

John T. Cabbage, Bartlesville, Okla., assignor to Phillips Petroleum Company, a corporation of Delaware
Filed Aug. 11, 1961, Ser. No. 130,914
6 Claims. (Cl. 208—361)

This invention relates to a combined stripping and flashing operation. In one of its aspects, the invention relates to a method of operation wherein a liquid is stripped of a strippable component in a stripping zone with a stripping medium and then subjected to a flashing treatment in a reduced pressure zone to remove traces of stripping medium therefrom wherein a stripping medium is used as motive fluid for a reduced pressure producing zone in open communication with a zone in which said flashing treatment is conducted, following which said motive fluid is passed to the stripping zone, wherein the amount of stripping medium passed to the operation is controlled responsive to an analysis of the final stripped liquid with respect to residual strippable component therein, and wherein the portion of the stripping medium used as said motive fluid is controlled responsive to analysis of the stripped and flashed liquid with respect to traces of stripping medium or fluid therein. In another of its aspects, the invention relates to an apparatus comprising in combination a stripper and a vacuum flasher, means for feeding a liquid to be stripped to said stripper, means for feeding stripped liquid from said stripper to said vacuum flasher, means upon said vacuum flasher for creating a reduced pressure therein, means for passing a stripping fluid to said means for producing a reduced pressure and then to said stripper, means upon said flasher for removing flashed liquid therefrom, means for analyzing said removed liquid for traces of stripping medium therein, means for analyzing said removed liquid for traces of strippable component therein, means responsive to said last-mentioned means for controlling total amount of stripping fluid passed to the system, and means for controlling the amount of stripping medium passed to said means for producing a reduced pressure, responsive to said first means for analyzing to control the proportion of stripping fluid passed to said means for producing said reduced pressure.

I have now conceived of an improved unitary operation wherein a stripping medium such as steam is used, at least in part, as motive fluid for an eductor or reduced pressure producing means and then as a stripping medium. Although the concepts basic to the invention are generally applicable, for illustrative purposes, it will now be described in an embodiment as the invention is applied to an operation set forth described and claimed in U.S. Patent 2,920,039, January 5, 1960, N. G. Miller, entitled "Vacuum Treatment of Liquids."

In the patent, an oil is stripped in a stripper and then passed to a vacuum unit wherein moisture due to residual stripping steam condensate is flashed from the oil. The vacuum unit is placed under reduced pressure by passing the steam used for stripping through a steam ejection means and then to the stripper. It has now occurred to me that by analyzing for moisture in the vacuum flashed oil, I can independently control the amount of steam passed to the ejector means and by analyzing the flashed oil for some property such as initial boiling point, flash point, or vapor pressure, or other property, I can control the total amount of steam passed to the operation, in effect, by-passing the ejector means with so much of the steam as is not required to produce the reduced pressure for the vacuum flashing.

An object of this invention is to provide method and means for an improved stripping and flashing of a liquid. Another object of this invention is to provide an improved method and means for automatically conducting the steam-stripping of an oil and then dehydrating said oil. A further object of this invention is to provide method and means for sub-dividing the total amount of stripping medium fed to a combined stripping and vacuum flashing operation wherein the reduced pressure is created utilizing the stripping medium as motive fluid for a reduced pressure-producing step or means.

Other aspects, objects and the several advantages of this invention are apparent from a study of this disclosure, the drawing and the appended claims.

According to this invention, there is provided an operation wherein the liquid is stripped of a strippable component in a stripping zone with a stripping medium and then subjected to treatment in the reduced pressure zone to remove traces of stripping medium therefrom, feeding stripping medium to said operation, in part directed to the stripping zone and in part to a reduced pressure-producing zone, in open communication with said reduced pressure zone, as motive fluid for said reduced pressure-producing zone, controlling the total amount of stripping medium fed to said operation responsive to the residual amount of strippable component in the liquid which has been subjected to treatment in said reduced pressure zone, controlling the portion of said total amount used as motive fluid for said reduced pressure-producing zone responsive to the residual amount of traces of stripping medium in said liquid which has been subjected to said reduced pressure and then feeding said last-mentioned portion to said stripping zone.

The invention will now be described in relation to an embodiment in which steam is employed as a stripping medium and as the motive fluid for the reduced pressure or sub-atmospheric pressure-producing zone.

Referring now to the drawing in which there is shown a specific form of apparatus according to the invention, a sponge oil and an effluent from a fluid catalytic cracking reactor are passed by way of pipes 1 and 2 into fractionator 3. Steam is introduced into fractionator 3 by way of pipe 4. It is known that the effluent from a fluid catalytic cracking reactor will contain some catalyst. This catalyst is recovered from the bottom of fractionator 3 as a slurry which is removed by way of pipe 5. The slurry is passed to a thickener apparatus (not shown) in which the catalyst is recovered for reuse upon separation of the major proportion of oil from it according to known manner. There are removed, in this embodiment, from fractionator 3, a heavy cycle oil by way of pipe 6 and an overhead by way of pipe 7, cooler 8, pipe 9, which conducts the condensate produced in cooler 8 and accompanying vapors to accumulator 10. Olefinic vapors and noncondensible gases which are found in accumulator 10 are taken overhead by way of pipe 11 for disposal, as is well known in the art. Bottoms from the accumulator which will comprise catalytically cracked gasoline are removed therefrom by way of pipe 12 and in part passed by pipe 13 into the top of fractionator 3 as reflux therefor. Production quantities of gasoline are removed from the system by way of pipe 14. There is also removed from fractionator 3, by way of pipe 15, a light cycle oil (450–650° F.) which is passed to stripper 16 in which it is stripped with steam introduced by way of pipe 17 into the bottom of the stripper. The stripper is operated at about 8 pounds per square inch gauge. Overhead from stripper 16 can be removed by way of pipe 18 for disposal as desired and can be, as desired, passed in whole or in part by way of pipe 19 to fractionator 3. Bottoms from stripper 16 are removed at a temperature of approximately 460° F. by way of pipe 20, cooler 21, and by way of pipe 22 are passed to vacuum unit 23. The vacuum unit is maintained under reduced pressure by steam ejection means 24. Light cycle oil is removed as product from the bottom of vacuum unit 23 by way of pipe 25. The vacuum unit is operated at approximately 125 mm. mercury absolute pressure. The pressure of the steam leaving the steam ejector means 24 will be about 10 pounds per square inch gauge and will be at a temperature sufficient to maintain the stripping action in stripper 16, previously described. The bottoms from steam stripper 16, in this embodiment, contain about 300–700 parts per million of water. Bottoms removed by way of pipe 25 from the vacuum unit will contain about 40 parts per million or less of water. Since the steam from the ejector or ejectors will contain some light oils unavoidably entrained, it will be noted that the said oils will be recovered in the stripping section of the process in the above-described drawing, stripper 16, since the steam from the ejectors is used in the stripper. Whenever unavoidably entrained products are not joined with the material leaving the bottom of stripper 16 and are, therefore, of a character as to pass overhead by way of pipe 18, these are returned by way of pipe 19 to fractionator and ultimately recovered for use elsewhere in the refinery. It will be noted that the light cycle oil product recovered by way of pipe 25 from vacuum unit 23 is not only a substantially dehydrated material but is, of course, light end free.

The oil leaving vacuum unit 23 will have a moisture cloud point of approximately −10° F.–0° F.

In the embodiment described, oil flash-over will amount to approximately 1/10 percent of the charge. However, there will be no oil loss, nor cooling water problem because the ejectors will exhaust their steam into the light cycle oil stripper 16. Since the steam exhaust is at about 10 pounds per square inch gauge and the light cycle oil sripper operates at about 8 pounds per square inch gauge, there is no problem here.

According to the invention, the steam to the operation is fed by pipe 26, valve 27, and three-way valve 28 into means 24. A portion of this steam by-passes 24 by way of pipe 29. The light cycle oil in pipe 25 is passed from the operation by flow-controller operated valve 30.

A sample of this oil is passed by pipe 31 to initial boiling point or other analyzer means 32. A signal from means 32 resets a flow-controller 33 which, in turn, sets valve 27 to supply a total of steam sufficient to operate the means 24 and stripper 16.

The means 32 can be any analyzing means such as a flash point, vapor pressure, or equivalent means. These means are well known in the art and do not form the invention here described, except as use is made of them in the execution of the invention.

Another sample of the oil in pipe 25 is passed by pipe 34 to a moisture analyzer 35 which produces a signal controlling valve 28 and, therefore, according to the invention, the amount of the stripping steam passing through steam ejection means 24.

In this embodiment, the bottoms of towers 16 and 23 are on liquid level control, controller 36 responsive to the level in 23 controlling the flow of oil to tower 16 by way of controlled valve 37 and controller 38, responsive to the level in 16 controlling the flow of oil to tower 23 by way of controlled valve 39.

The described system is suitable for drying heavy oil distillates for which an optimum temperature and pressure would be approximately 125 mm. mercury absolute pressure at about 280° F. in the vacuum unit 23. Also, the described equipment would be suitable for vacuum flashing of light hydrocarbons from polymer streams, drying distillate yields at crude topping units or drying distillate transfers to loading tanks.

It will be clear to one skilled in the art in possession of this disclosure that a physical handling method has been described. The feed to this method can be varied at will. The invention is in the combination of steps which are employed and not in any particular feed stock. Therefore, the invention is not to be restricted to any particular feed stock. It will also be clear to one skilled in the art in possession of this disclosure that if the treating vapor in stripper 16 should be other than steam, that the said vapor might well be employed as the motive fluid for the ejector means 24. For example, a chemical reaction might well be carried out in stripper 16. The modus operandi or physical handling of the said chemical reaction could then be effected by feeding one of the reactants directly to vessel 16 and feeding the other reactant to vessel 16 by way of ejector means 24, in the form of a vapor, thus to actuate ejector means 24. In such a process, vacuum unit 23 would serve to remove the water of reaction, for example. Thus, the vessel 16 would be operated at a temperature at which most but not all of the water would be taken off or most of the water would be decanted at a point between vessel 16 and vessel 23. Vessel 23 would remove the final traces of water.

An initial boiling point recorder means which can be adapted to the practice of the present invention is made by the Hallikanien Instruments Company of Berkeley, California.

The moisture analyzer is obtainable from Manufacturing Engineering Equipment Company in Hatboro, Pennsylvania, or from Consolidated Electrodynamics, Pasadena, California.

To further illustrate my invention treating light cycle oil with the vacuum stripper 23 operating at 280° F. and 125 mm. Hg absolute pressure, and the steam stripper operating at 8 p.s.i.g. and 460° F. bottoms temperature, the dried oil exits by way of conduit 25 with about 20 parts per million water therein as determined by the moisture analyzer-controller 35, which controller actuates control of the quantity of steam charged to eductor 24 by way of valve 28. When the analyzer-controller 35 senses an increase in moisture, e.g., above about 25 p.p.m., valve 28 is adjusted to flow additional steam through eductor 24 to reduce the pressure in vessel 23 to about 115 mm. Hg absolute pressure, the temperature decreasing to about 276° F. This automatic control of steam to the eductor 24 again produces the desired dried oil in conduit 25 of below about 25 p.p.m. water. During this operation, no change was made in the total steam controlled by valve 27, since the initial boiling point of the oil in conduit 25 is above the allowed minimum of 450° F.

In another case where the moisture content is maintained below about 25 p.p.m., but where the initial boiling point of the oil in conduit 25 drops to below about 450° F., the analyzer-controller 32 actuates a further opening of valve 27 to add additional steam to the system so that a greater degree of steam stripping is effected in stripper 16 to maintain the initial boiling point of the oil in conduit 25 above about 450° F.

Both the water content of the oil in conduit 25 can be too high and the initial boiling point of the oil in conduit 25 can be too low, of course, and the analyzer-controllers 32 and 35, respectively, will effect the proper valve settings on valves 27 and 28, respectively, to bring the steam stripping and the vacuum operations to proper functioning to yield the oil in conduit 25 of the desired moisture content (below about 25 p.p.m.) and desired initial boiling point (above about 450° F.).

In another embodiment, as shown on the drawing, instead of using the signal from the moisture analyzer controller 35 to directly control the valve 28, I use a flow controller 40 to control the valve 28. The moisture controller 35 then acts to reset the flow controller 40. This is a preferred control system since, for example, when the moisture content of stream 25 is at or below the desired minimum, but the initial boiling point is too low, a demand by controller 32 for more total steam, by way of valve 27, will not increase the steam through eductor 24 (which increase is not necessary when the moisture content is below the desired minimum amount). This above-described system minimizes "hunting" by the instrumentation.

Reasonable variation and modification are possible within the scope of the foregoing disclosure, the drawing and the appended claims to the invention, the essence of which is that in a combined stripping and vacuum or reduced pressure treatment of a liquid, the motive fluid producing the reduced pressure and stripping medium are the same, the total feed of stripping medium to the operation is controlled responsive to the stripped liquid purity and this total feed is essentially passed in part directly to the stripping zone and in part to the reduced pressure-producing zone as motive fluid therefor, the latter part being proportioned according to the residual amount of stripping medium remaining in the stripped liquid leaving the reduced pressure zone, and then said latter part is also passed to the stripping zone.

I claim:

1. The steps in an operation for the stripping of a liquid which comprise:
    (a) stripping in a stripping zone a liquid of strippable components with a stripping medium;
    (b) passing stripped liquid into a reduced pressure zone to remove traces of stripping medium therefrom;
    (c) maintaining said zone, which is maintained at reduced pressure, at such a pressure by operation of a sub-atmospheric pressure-producing zone employing said stripping medium as actuating fluid for said last-mentioned zone;
    (d) removing from said reduced pressure zone, liquid which has been subjected to removal therefrom of stripping medium by virtue of said reduced pressure;
    (e) passing said stripping medium fed to the operation first to said sub-atmospheric pressure-producing zone as actuating medium therefor and from said zone, together with traces of stripping medium leaving said reduced pressure zone by way of said sub-atmospheric pressure-producing zone, to said stripping zone;
    (f) also passing at least a portion of stripping medium fed to the operation directly into said stripping zone;
    (g) analyzing the liquid removed from said zone maintained at a sub-atmospheric or reduced pressure to make a determination of its residual content of said traces of stripping medium;
    (h) controlling the amount of stripping medium used as under (e) hereof responsive to said determination;
    (i) also analyzing the liquid removed from said zone maintained at a sub-atmospheric pressure to make a determination of its content of lighter ends; and
    (j) controlling the amount of stripping medium used as under (f) hereof responsive to said last-mentioned determination.

2. An operation according to claim 1 wherein the liquid is a hydrocarbon oil to be stripped of light end components, the stripping medium is steam and the reduced pressure is a sub-atmospheric pressure.

3. In an operation wherein a liquid is stripped of a strippable component in a stripping zone with a stripping medium and then subjected to treatment in a reduced pressure zone to remove traces of stripping medium therefrom, feeding stripping medium to said operation, in part directly to the stripping zone and in part to a reduced pressure-producing zone, in open communication with said reduced pressure zone as motive fluid for said reduced pressure-producing zone, controlling the total amount of stripping medium fed to said operation responsive to the residual amount of strippable component in the liquid which has been subjected to treatment in said reduced pressure zone, controlling the portion of said total amount used as motive fluid for said reduced pressure-producing zone responsive to the residual amount of traces of stripping medium in said liquid which has been subjected to said reduced pressure and then feeding said last-mentioned portion to said stripping zone.

4. An apparatus comprising in combination a stripper and a vacuum flasher, means for feeding a liquid to be stripped to said stripper, means for feeding stripped liquid from said stripper to said vacuum flasher, means upon said vacuum flasher for creating a reduced pressure therein, means for passing a stripping fluid to said means for producing a reduced pressure and then to said stripper, means upon said flasher for removing flashed liquid therefrom, means for analyzing said removed liquid for traces of stripping medium therein, means for analyzing said removed liquid for traces of strippable component therein, means responsive to said last-mentioned means for controlling total amount of stripping fluid passed to the system, and means for controlling the amount of stripping medium passed to said means for producing a reduced pressure, responsive to said first means for analyzing to control the proportion of stripping fluid passed to said means for producing said reduced pressure.

5. An apparatus according to claim 4 wherein means to reset the means for controlling the amount of stripping medium passed to said means for producing a reduced pressure are cooperatively included and wherein said means to reset is responsive to, and is reset by, said first means for analyzing.

6. In an operation wherein a liquid hydrocarbon oil is to be stripped of light end components and wherein the stripping medium selected is suitable for stripping said hydrocarbon oil of said light end components in a stripping zone and wherein the stripped liquid is then subjected to treatment in a reduced pressure zone to remove traces of stripping medium therefrom, the steps which comprise feeding stripping medium to said operation, in part directly to the stripping zone and in part to a reduced pressure-producing zone, in open communication with said reduced pressure zone as motive fluid for said reduced pressure-producing zone, controlling the total amount of stripping medium fed to said operation responsive to the residual amount of strippable light end components in the hydrocarbon liquid oil which has been subjected to treatment in said reduced pressure zone, controlling the portion of said total amount of stripping medium used as motive fluid for said reduced pressure-producing zone responsive to the residual amount of traces of stripping medium in said liquid hydrocarbon oil which has been subjected to said reduced pressure and then feeding said last-mentioned portion to said stripping zone.

References Cited in the file of this patent

UNITED STATES PATENTS

| 2,734,566 | Simms | Feb. 14, 1956 |
| 2,749,281 | Ferro | June 5, 1956 |
| 2,920,039 | Miller | Jan. 5, 1960 |
| 3,018,230 | Morgan | Jan. 23, 1962 |

FOREIGN PATENTS

| 821,983 | Great Britain | Oct. 14, 1959 |